United States Patent
Cheung et al.

(10) Patent No.: US 9,427,835 B2
(45) Date of Patent: Aug. 30, 2016

(54) NANO-METAL COATED VANE COMPONENT FOR GAS TURBINE ENGINES AND METHOD OF MANUFACTURING SAME

(75) Inventors: Kin-Leung Cheung, Toronto (CA); Enzo Macchia, Kleinburg (CA); Barry Barnett, Markham (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 1190 days.

(21) Appl. No.: 13/408,096

(22) Filed: Feb. 29, 2012

(65) Prior Publication Data
US 2013/0224008 A1 Aug. 29, 2013

(51) Int. Cl.
| | |
|---|---|
| *F01D 5/14* | (2006.01) |
| *F01D 9/04* | (2006.01) |
| *B23P 17/00* | (2006.01) |
| *F01D 5/28* | (2006.01) |
| *F01D 25/02* | (2006.01) |
| *F01D 25/16* | (2006.01) |
| *F02C 7/047* | (2006.01) |
| *B82Y 30/00* | (2011.01) |

(52) U.S. Cl.
CPC .......... *B23P 17/00* (2013.01); *F01D 5/147* (2013.01); *F01D 5/288* (2013.01); *F01D 9/041* (2013.01); *F01D 25/02* (2013.01); *F01D 25/162* (2013.01); *F02C 7/047* (2013.01); *B82Y 30/00* (2013.01); *F05D 2230/31* (2013.01); *F05D 2250/28* (2013.01); *F05D 2300/10* (2013.01); *Y10T 29/49229* (2015.01); *Y10T 29/49323* (2015.01); *Y10T 29/49339* (2015.01)

(58) Field of Classification Search
CPC .......... F01D 5/14; F01D 5/147; F01D 5/288; F05D 2230/31
See application file for complete search history.

(56) References Cited

U.S. PATENT DOCUMENTS

| | | | |
|---|---|---|---|
| 2,581,252 | A | 1/1952 | Goetzel et al. |
| 3,291,382 | A | 12/1966 | Vaughau et al. |
| 3,892,612 | A | 7/1975 | Carlson et al. |
| 4,023,249 | A | 5/1977 | Darrow et al. |
| 4,063,847 | A | 12/1977 | Simmons |
| 4,377,370 | A | 3/1983 | Porcelli |
| 4,619,699 | A | 10/1986 | Petkovic-Luton et al. |
| 4,655,682 | A | 4/1987 | Kunz et al. |
| 4,921,405 | A | 5/1990 | Wilson |

(Continued)

FOREIGN PATENT DOCUMENTS

| | | |
|---|---|---|
| EP | 229519 | 11/1996 |
| JP | 1-200003 A | 8/1989 |

(Continued)

OTHER PUBLICATIONS

Integran Technologies Inc.: http://www.integran.com/pages/plating_plastics.html.

(Continued)

*Primary Examiner* — Igor Kershteyn
*Assistant Examiner* — Christopher R Legendre
(74) *Attorney, Agent, or Firm* — Norton Rose Fulbright Canada LLP

(57) ABSTRACT

A method of manufacturing a vane component of a gas turbine engine is described, and includes forming a core of the vane component using a rapid manufacturing process, and applying a coating of nanocrystalline metal onto the core, the nanocrystalline metal fully encapsulating the core and defining an outer structural surface of the vane component.

15 Claims, 7 Drawing Sheets

(56) References Cited

U.S. PATENT DOCUMENTS

| | | |
|---|---|---|
| 4,957,415 A | 9/1990 | Paul et al. |
| 5,149,251 A | 9/1992 | Scanlon et al. |
| 5,252,160 A | 10/1993 | Scanlon et al. |
| 5,314,304 A | 5/1994 | Wiebe |
| 5,358,029 A | 10/1994 | Baveja et al. |
| 5,449,273 A | 9/1995 | Hertel et al. |
| 5,486,096 A | 1/1996 | Hertel et al. |
| 5,601,933 A | 2/1997 | Hajmrle et al. |
| 5,635,654 A | 6/1997 | Hebsur et al. |
| 5,881,972 A | 3/1999 | Smith et al. |
| 6,110,604 A | 8/2000 | Rickerby |
| 6,341,747 B1 | 1/2002 | Schmidt et al. |
| 6,358,014 B1 | 3/2002 | Chou et al. |
| 6,482,532 B1 | 11/2002 | Yap et al. |
| 6,482,537 B1 | 11/2002 | Strangman et al. |
| 6,617,049 B2 | 9/2003 | Darolia et al. |
| 6,620,525 B1 | 9/2003 | Rigney et al. |
| 6,723,387 B1 | 4/2004 | Kear et al. |
| 6,729,846 B1 | 5/2004 | Wobben |
| 6,773,817 B1 | 8/2004 | Sagel et al. |
| 6,875,529 B1 | 4/2005 | Spitsberg et al. |
| 6,887,589 B2 | 5/2005 | Pfaendtner et al. |
| 6,973,792 B2 | 12/2005 | Hicks |
| 7,080,973 B2 | 7/2006 | Tung et al. |
| 7,108,485 B2 | 9/2006 | Wobben |
| 7,186,092 B2 | 3/2007 | Bruce et al. |
| 7,247,348 B2 | 7/2007 | Power |
| 7,300,708 B2 | 11/2007 | Gigliotti, Jr. et al. |
| 7,311,981 B2 | 12/2007 | Saint Ramond et al. |
| 7,320,832 B2 | 1/2008 | Palumbo et al. |
| 7,344,675 B2 | 3/2008 | Van Daam et al. |
| 7,354,354 B2 | 4/2008 | Palumbo et al. |
| 7,354,490 B2 | 4/2008 | Fritzemeier et al. |
| 7,361,386 B2 | 4/2008 | Kim et al. |
| 7,364,806 B2 | 4/2008 | Matsumoto et al. |
| 7,387,578 B2 | 6/2008 | Palumbo et al. |
| 7,387,587 B2 | 6/2008 | Dean |
| 7,431,566 B2 | 10/2008 | Gray et al. |
| 7,517,930 B2 | 4/2009 | Eschborn et al. |
| 7,640,661 B2 | 1/2010 | Despreaux et al. |
| 7,662,207 B2 | 2/2010 | Miura et al. |
| 7,740,960 B1 | 6/2010 | Zhu et al. |
| 7,753,653 B2 | 7/2010 | Cairo et al. |
| 7,758,306 B2 | 7/2010 | Burton et al. |
| 7,766,623 B2 | 8/2010 | Chou et al. |
| 7,775,772 B2 | 8/2010 | Carrier et al. |
| 7,784,182 B2 | 8/2010 | Carrier et al. |
| 7,824,507 B2 | 11/2010 | Van Daam et al. |
| 7,914,256 B2 | 3/2011 | Xie et al. |
| 7,942,638 B2 | 5/2011 | Eichmann et al. |
| 8,545,994 B2 | 10/2013 | Facchini et al. |
| 2002/0045053 A1 | 4/2002 | Hoskin |
| 2003/0138301 A1 | 7/2003 | Kuerzel |
| 2004/0172827 A1 | 9/2004 | Kinstler et al. |
| 2004/0219010 A1 | 11/2004 | Merrill et al. |
| 2005/0133121 A1 | 6/2005 | Subramanian et al. |
| 2005/0135928 A1 | 6/2005 | Servadio et al. |
| 2005/0205425 A1 | 9/2005 | Palumbo et al. |
| 2005/0255329 A1 | 11/2005 | Hazel |
| 2005/0260078 A1 | 11/2005 | Potter et al. |
| 2005/0278950 A1 | 12/2005 | Despreaux et al. |
| 2006/0147688 A1 | 7/2006 | Subramanian et al. |
| 2006/0193742 A1 | 8/2006 | Miura et al. |
| 2007/0087185 A1 | 4/2007 | Wei et al. |
| 2007/0099027 A1 | 5/2007 | Krishnamurthy et al. |
| 2007/0140853 A1 | 6/2007 | McCann et al. |
| 2007/0141370 A1* | 6/2007 | Kerber .......... 428/469 |
| 2007/0163114 A1* | 7/2007 | Johnson .......... 29/889.2 |
| 2007/0190245 A1 | 8/2007 | Gupta et al. |
| 2008/0145649 A1 | 6/2008 | Mannem et al. |
| 2008/0170943 A1* | 7/2008 | Cairo et al. .......... 416/224 |
| 2008/0216383 A1 | 9/2008 | Pierick et al. |
| 2008/0298976 A1 | 12/2008 | Kriegl |
| 2009/0016894 A1* | 1/2009 | Strother .......... 416/241 R |
| 2009/0028697 A1* | 1/2009 | Shi et al. .......... 415/200 |
| 2009/0055339 A1 | 2/2009 | Bernard |
| 2009/0081032 A1 | 3/2009 | Moroso et al. |
| 2009/0120101 A1 | 5/2009 | Lomasney et al. |
| 2009/0229984 A1 | 9/2009 | Schuh et al. |
| 2010/0055339 A1 | 3/2010 | Shinde et al. |
| 2010/0226782 A1 | 9/2010 | Eichmann et al. |
| 2010/0304063 A1 | 12/2010 | McCrea et al. |
| 2010/0304065 A1 | 12/2010 | Tomantschger et al. |
| 2010/0304171 A1 | 12/2010 | Tomantschger et al. |
| 2010/0304172 A1 | 12/2010 | Facchini et al. |
| 2010/0304179 A1 | 12/2010 | Facchini et al. |
| 2010/0304181 A1 | 12/2010 | Anand et al. |
| 2011/0020548 A1 | 1/2011 | Eichmann et al. |
| 2011/0176927 A1 | 7/2011 | Alexander et al. |
| 2011/0211967 A1 | 9/2011 | Deal et al. |
| 2011/0287223 A1 | 11/2011 | Victor et al. |
| 2012/0051935 A1 | 3/2012 | Naik et al. |
| 2012/0082553 A1* | 4/2012 | Eleftheriou et al. .... F01D 5/147 416/224 |
| 2012/0082556 A1* | 4/2012 | Macchia et al. ........ F01D 5/147 416/241 A |
| 2012/0175534 A1 | 7/2012 | Jung et al. |

FOREIGN PATENT DOCUMENTS

| | | |
|---|---|---|
| JP | 6-159003 A | 6/1994 |
| WO | 2009006871 | 1/2009 |
| WO | 2009006871 A2 | 1/2009 |

OTHER PUBLICATIONS www.repliforminc.com/products.htm#RePliKote, Copyright 2006.
Izumi, Method of Adhering Anticorrosion piece in turbine blade, Aug. 11, 1989, PAJ, Abstract of JP1-200003A.
Aoki, Gas Turbine Blade, Jun. 7, 1994, PAJ, Abstract of JP6-159003A.
Tjong, Nanocrystalline Materials and Coatings, Aug. 10, 2004.
Lima, Microstructural Characteristics of Cold-Sprayed Nanostructured WC-Co Coatings, Jul. 2002, Thin Solid Films 416, 129-135.
Integran Technologies Inc.: http://www.integran.com/pages/nano_ns.html.

* cited by examiner

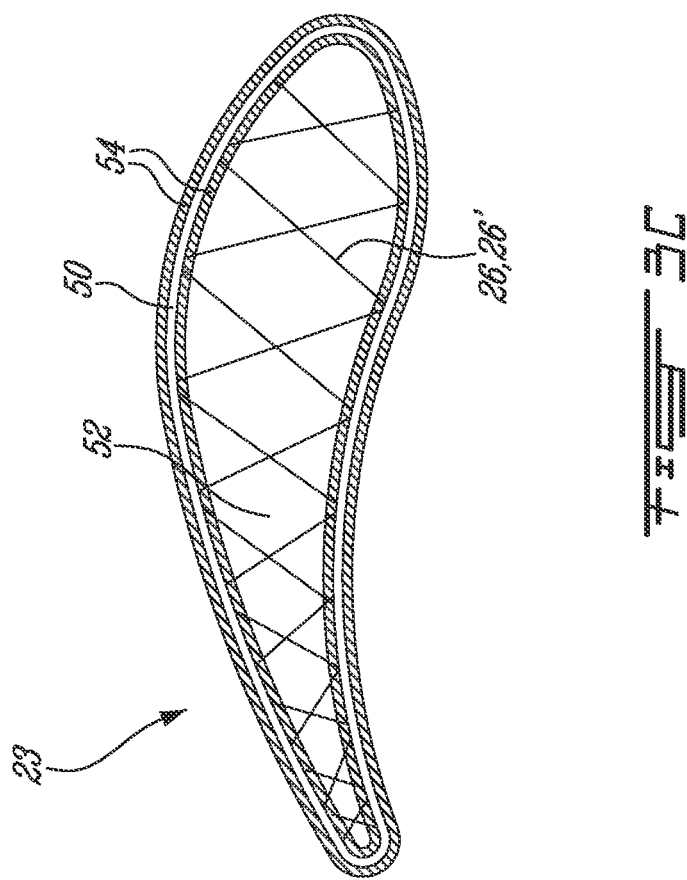

NANO-METAL COATED VANE COMPONENT FOR GAS TURBINE ENGINES AND METHOD OF MANUFACTURING SAME

TECHNICAL FIELD

The present disclosure relates generally to gas turbine engine vanes and vane-shroud assemblies, and more particularly to such vanes and vane assemblies having a coating thereon.

BACKGROUND

Compressor vanes in aero gas turbine engines are typically manufactured from aluminum, steel, nickel allows, or from carbon fiber composites. The airfoil shapes of such vanes have to date, however, remained relatively simple in order to enable the vanes to be manufactured from relatively simple metal forming methods. Aerodynamic performance improvements have led to more complex shapes especially on the leading edges (LE) of vanes, which results in metal vanes that must be machined from solid bars.

Increasing demands for lower weight products in aero gas turbine engines have seen an increasing use of carbon fibre composite products, especially vanes. FOD (foreign object damage) resistance, including resistance to ice projectiles for example, and erosion resistance for carbon composite vanes is often achieved by using a metal sheath that is bonded onto the leading edge (LE) of the composite vane. When the vane LE shape is relatively simple, the manufacture and application of the metal sheath is straightforward. However, when the LE is a complex shape, the metal sheath is required to be manufactured from alternative methods such as hydroforming and this results in higher cost.

Furthermore, complex aerodynamic vane shapes often have to be compromised for reasons of vane dynamics, resulting in reduced engine performance and increased specific fuel consumption.

Accordingly, improved vanes and vane assemblies which offer, for example, the ability to form complex airfoil shapes having uncompromised aerodynamic characteristics and satisfactory vane dynamic characteristics, while remaining lightweight yet sufficiently resistant to erosion and/or FOD and which can be readily manufactured at low cost, are desirable.

SUMMARY

In accordance with one aspect, there is provided a method of manufacturing a vane component of a gas turbine engine, the method comprising: forming a core of the vane component out of a substrate material using a rapid manufacturing process; and applying a coating of nanocrystalline metal onto the core, the nanocrystalline metal fully encapsulating the core and defining an outer structural surface of the vane component.

There is also provided, in accordance with another aspect, a method of manufacturing a vane component of a gas turbine engine, the method comprising the steps of: i) using a computer-controlled rapid manufacturing machine to produce a pre-form core of said vane component out of a core substrate material, the core substrate material comprising composite, polymer or metal, the computer-controlled rapid manufacturing machine being controlled by a computer readable information source representative of the core of the vane component; and ii) plating said pre-form core produced by the computer-controlled rapid manufacturing machine with a nano-grain size metallic coating to encapsulate the pre-form core with said nano-grain size metallic coating.

There is further provided, in accordance with yet another aspect, a vane component for a gas turbine engine, the vane component comprising: a pre-form core having an internal space frame structure, the pre-form core being composed of a material formed by a rapid manufacturing process, the pre-form core being at least partially hollow and defining a cavity therewithin; and an outer coating fully encapsulating the pre-form core and defining at least an outer structural surface of the vane component, the outer coating being composed of a nanocrystalline metal.

BRIEF DESCRIPTION OF THE DRAWINGS

Reference is now made to the accompanying figures in which:

FIG. 3b is a perspective view of a vane of the vane ring assembly of FIG. 3a;

FIG. 3c is a cross-sectional view taken through line 3C-3C in FIG. 3b;

DETAILED DESCRIPTION

Figure 1:
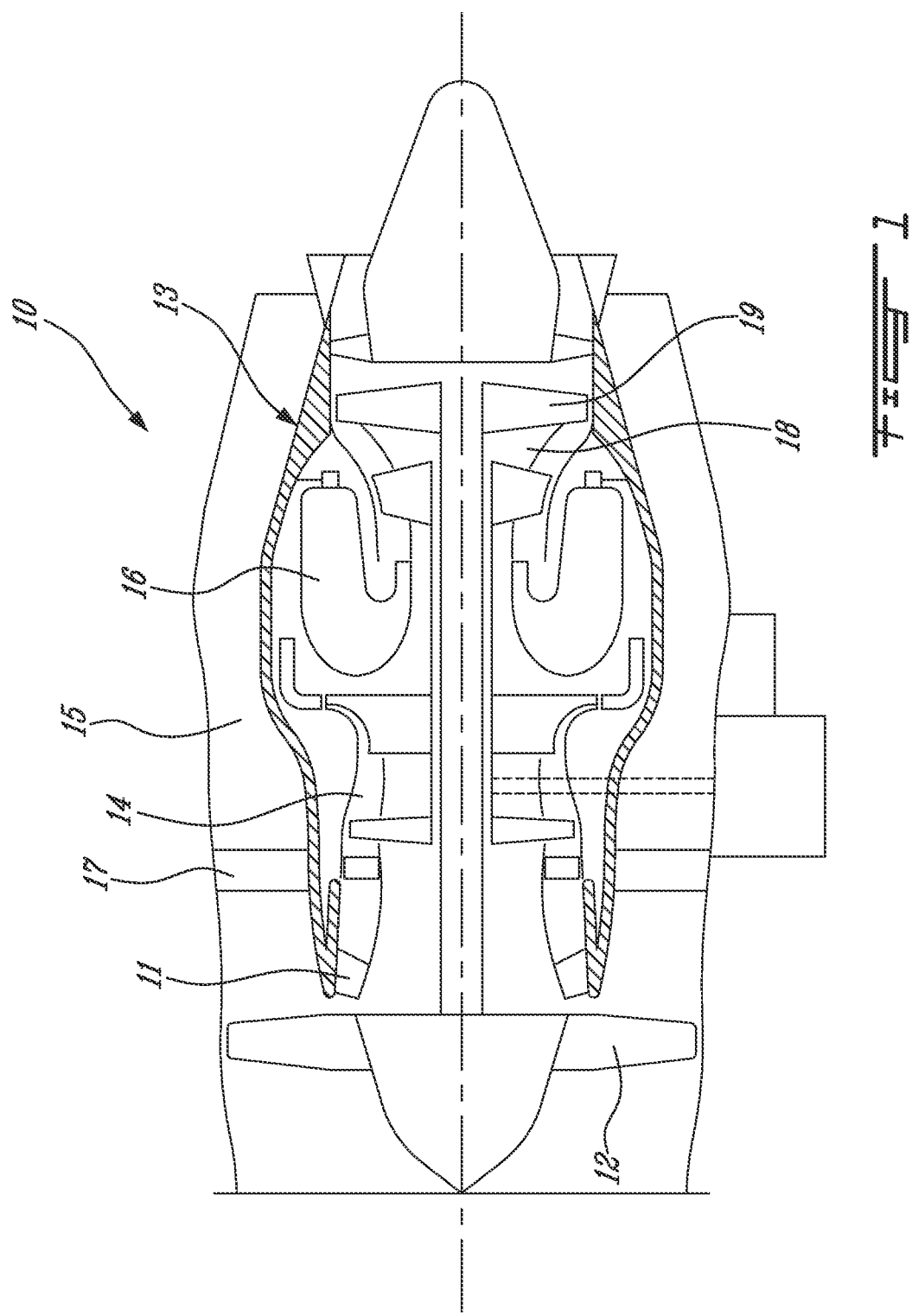
FIG. 1 is a schematic cross sectional view of a gas turbine engine.

Referring now to the drawings, and more particularly to FIG. 1, there is illustrated a gas turbine engine 10 generally comprising in serial flow communication, a fan 12 through which ambient air is propelled, and a core 13 including a compressor section 14 for pressurizing the air, a combustor 16 in which the compressed air is mixed with fuel and ignited for generating an annular stream of hot combustion gases, and a turbine section 18 for extracting energy from the combustion gases. The engine also includes a core fan inlet guide vane 11 located downstream of the fan 12 and guiding the primary airflow towards the compressor section 14. The engine further includes a bypass duct 15 surrounding the core 13 and through which a portion of the air propelled by the fan 12 flows to bypass the core, and a bypass fan exit stator 17 extending across the bypass duct 15 to guide the airflow therethrough. The method of manufacturing described hereinbelow may be applied to airfoil assemblies of any suitable gas turbine engine in which the airfoil assembly is either fixed or rotating, and may include for example the fixed vanes or the rotating airfoil blades of either the compressor or turbine section of the engine.

Figure 3A:
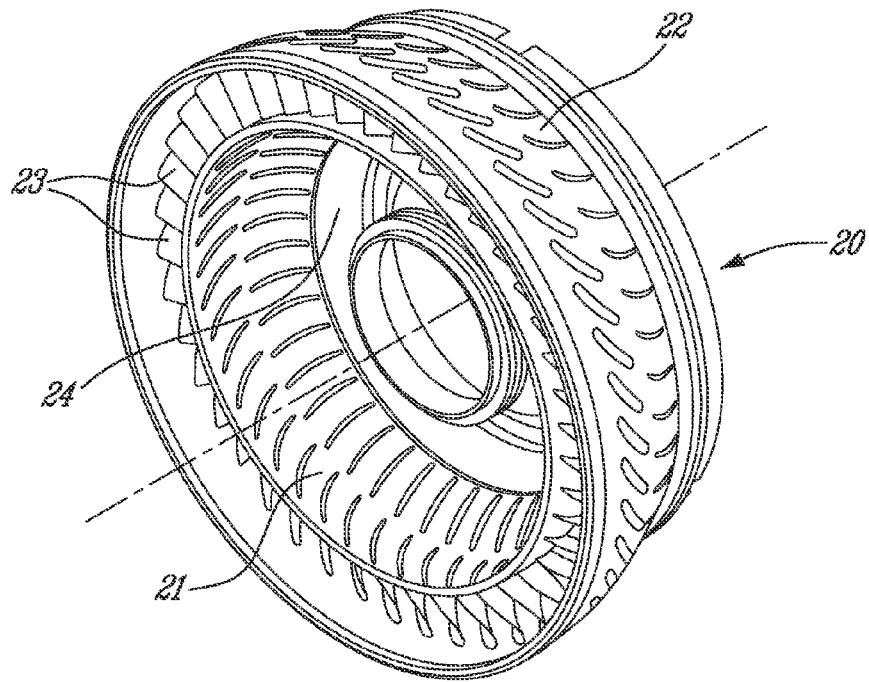
FIG. 3a is a perspective view of a vane ring assembly.

FIG. 3a shows a vane ring assembly 20 which is comprised generally of an inner shroud 21 and an outer shroud 22 and between which a plurality of vanes 23 extend. The vanes 23 may be replaceable vanes which are removably mounted to the inner and outer shrouds 21, 22 of the assembly 20, although the vanes 23 may also have integrally formed inner and outer vane shrouds/platforms. The inner shroud assembly 24 of the vane ring assembly 20 is securable to a corresponding supporting case or other component within the engine to fix it in place therein.

Figure 2:
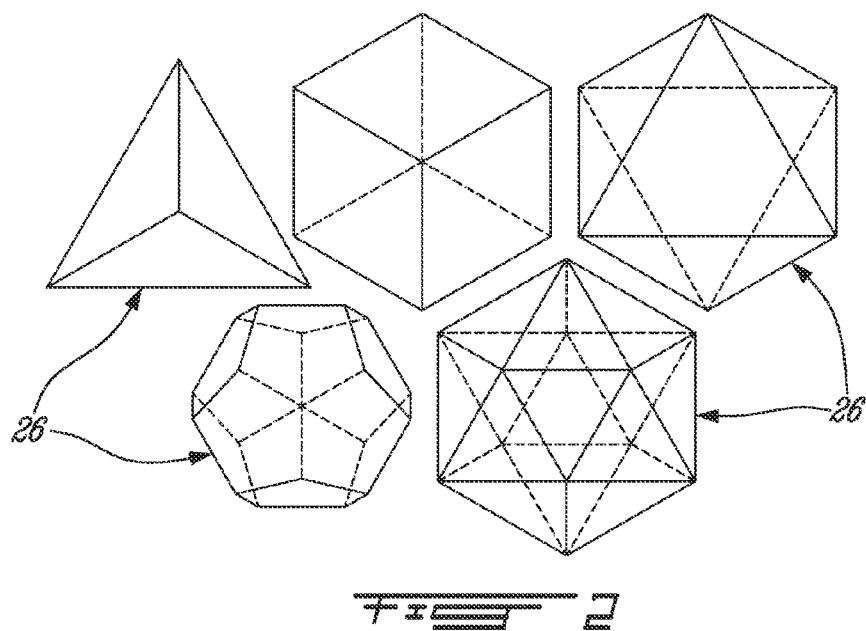
FIG. 2 shows drawing representations of a few examples of space frame structural design shapes for the open space core of the airfoil hollow vane or hollow vane shroud or vane ring assembly or fairing.
Figure 3B:
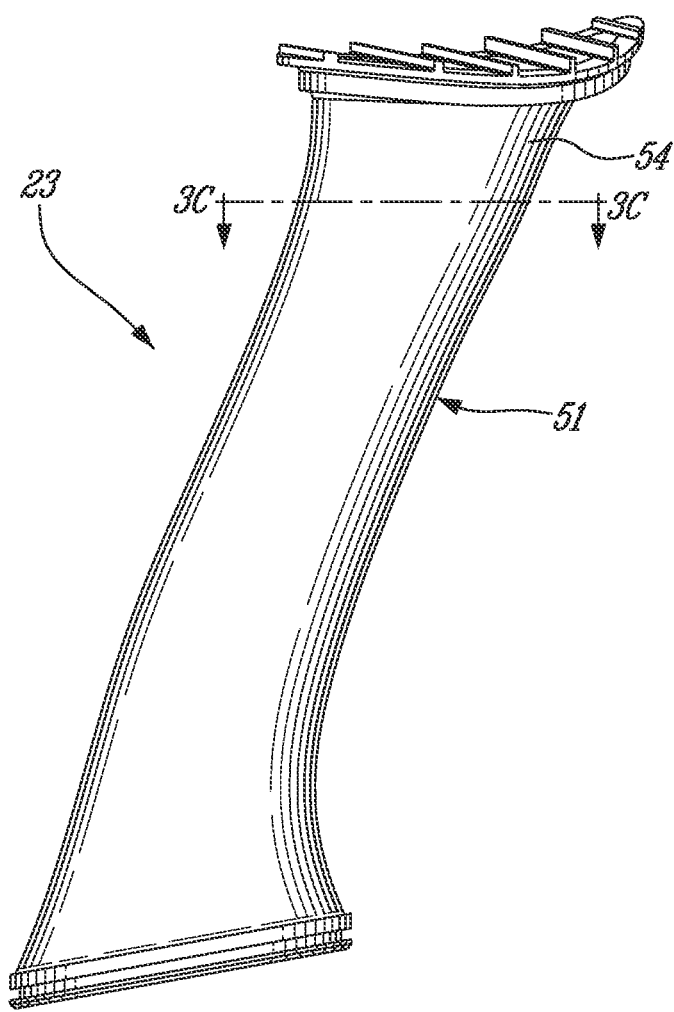
Figure 4:
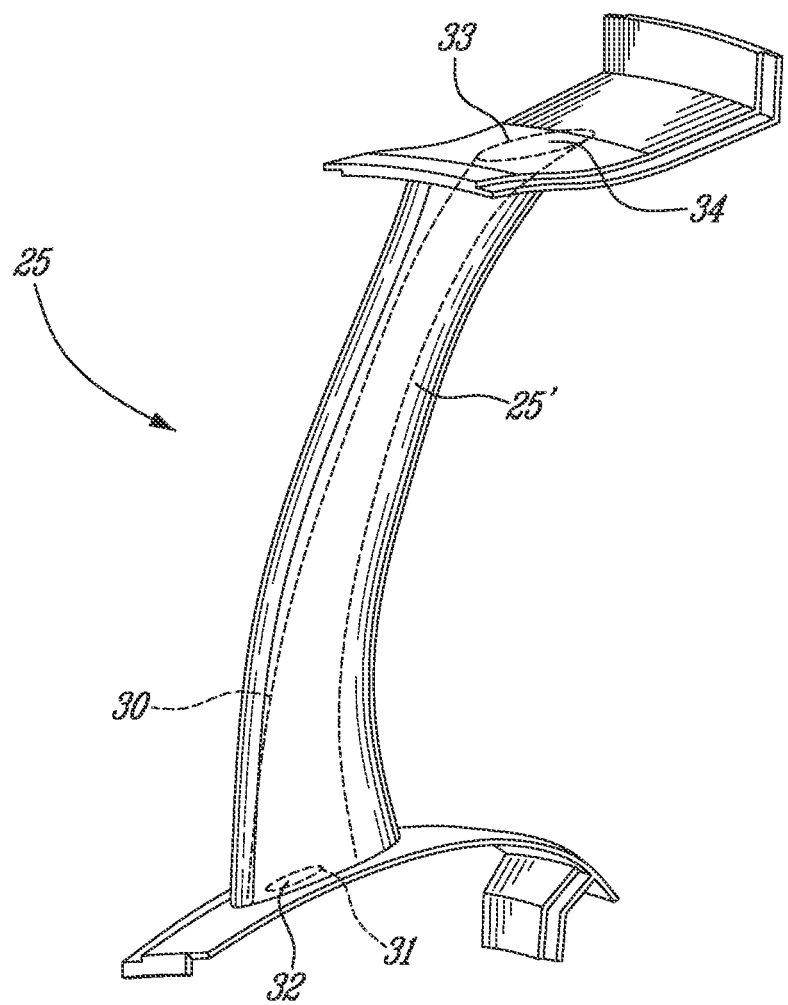
FIG. 4 is a perspective view of a vane-shroud pack of a vane ring assembly, the vane-shroud pack having one or more vanes.

More specifically, but not exclusively, the vane components as described herein may be a vane 23 as shown in FIG. 3b, or a vane-shroud pack 25 as shown in FIG. 4 (which vane-shroud pack may include either a single vane as shown in FIG. 4 or alternately may include multiple-vanes), or the vane shrouds 21 and 22 of the vane ring 20 as shown in FIG. 2.

As seen in FIGS. 3b-3c, the individual vanes 23 are, in at least one embodiment, substantially hollow and define a space frame 26 or cavity 52 therewithin. This space frame 26 or cavity 52 may be left open such that hot air may be fed therethrough for use in de-icing of the vane for example, however alternately this cavity 52 may be sealed shut and thus closed out by a correspondingly shaped end cap which is fixed to either end of the vane by adhesive bond, laser weld, electron beam weld, etc. to seal the end caps in place and thus sealingly enclose the vane cavity 52. The space frame 26, defining the cavity 52 therewithin, may be a single geometry or may comprise multiple geometries as seen in FIG. 2. The inner and outer shrouds 21, 22 of the vane ring assembly 20 may also be at least partially hollow, defining therewithin plenums and/or other cavities such as to allow for a space frame structure of high energy absorption efficiency for containment of rotor blades in the event of lost blades, for dynamics tuning, for airflow therethrough for cooling, de-icing, etc. All of the vane components as described herein may however also be solid (i.e. not hollow).

The vane components described herein, namely the vanes 23, the inner and outer shrouds 21, 22 and/or the entire vane ring assembly 20, are produced having a bi-material or bi-layer structure, using a manufacturing method as will be described in further detail below. While this method will be generally described below with reference to the hollow vane 23, it is to be understood that the presently method may be used to produce any of the vane components mentioned above, whether they are solid or hollow.

Referring with particular reference to the vane 23 as shown in FIGS. 3b-3c, the vane 23 generally comprises a core or "pre-form" 50 made of a substrate material (such as composite, polymer or metal) that is produced using a rapid prototyping (RP) or rapid manufacturing (RM) manufacturing process, and which is then coated with an exterior nano-metal coating 54. As noted above, the core 50 of the vane 23 may be hollow and is therefore formed having a space frame 26 and/or cavity 52 extending at least partially therethrough along the longitudinal length of the airfoil 51 of the vane 23. The cavity 52 may be defined by a space frame of a single geometry or of multiple geometries as shown in FIG. 2.

The pre-form 50 of the vane component having the space frame 26 and/or cavity 52 therein may be fabricated by a rapid manufacturing process (e.g. stereolithography, 3D printing, laser deposition, or other rapid manufacturing techniques such as, but not limited to, selective laser sintering, direct light fabrication, laser engineered net shaping, direct metal deposition, direct laser powder deposition, etc.) from a material such as composite, polymer or metal, in order to create the completed shape of the core 50. Once this core 50 is so formed, a nanocrystalline coating 54 as described in further detail below is applied thereto in order to fully encapsulate the hollow core structure 50. As seen in FIG. 2, the space frame structure 26 can have any number of possible geometric shapes, configurations, density and/or size, arm lengths, arm thicknesses, and any combinations thereof. As seen in FIG. 2, several different possible core space frame structures 26 are shown, including a hexahedron, tetrahedron, square, rectangular, etc.

While a number of possible advantages exist when using a space frame structure 26 upon which the rapid manufactured material is deposited in order to form the final shape of the vane component core 50, this permits a hollow shape to be relatively easily formed having specific tailored properties and characteristics at any desired specified locations of the core 50, e.g. strength, dynamics, impact resistance, erosion resistance, etc. Additionally, by providing such a space frame structure 26, the amount of substrate material deposition required to produce the hollow core 50 of the component is significantly reduced relative to a fully solid component produced using the same rapid manufacturing process. The end result is a core 50 that is lighter and faster to manufacture.

Additionally, this structure of the core 50, namely an underlying space frame structure 26 upon which the material (ex: polymer, composite or metal) is deposited using a rapid manufacturing technique, also enables the component to be dynamically tuned as desired without effecting the shape of the exterior surface of the vane component and thus without negatively effecting aerodynamic performance. For example, the airfoil surfaces of the hollow core 50 may be designed for the best aerodynamic shape for performance and the space frame 26 and/or cavity 52 geometry can be varied as required without changing the outer aerodynamic airfoil shape, thereby permitting the core 50 to be aerodynamically tuned, and thus the overall vane aerodynamics are not compromised by the vane dynamics. The presently described hollow vane components are thus dynamically tunable, in that the space frame arm thickness, arm length, size and/or density, geometry, and combinations thereof, at various different locations of the hollow vane cavity 52 can be varied as required, in order to dynamically tune the overall vane component dynamics as may be desired. Because the rapid manufacturing process used to deposit the core substrate material which fabricates the space frame structure 26 permits precise variations in the desired material thickness, density, space frame geometry, etc., a core 50 produced in this manner can be easily tailored as required in terms of preferred dynamic characteristics without sacrificing the vane aerodynamic shape and weight (for example by rendering it unnecessary to tune vane dynamics by changing the airfoil shape, thicken the airfoil, or increase the leading edge thickness, etc., and while still being very rapidly produced (in comparison with traditional machining processes for example).

It is to be understood that in one possible embodiment, the core 50 of the presently described vane components does not include such a space frame structure 26 as an underlying skeleton within the core 50. Rather, the material forming the core 50 of the vane component may be either solid or hollow, and free of any such space frame structure 26 therewithin.

As mentioned above, the core or "pre-form" 50 of the vane 23 is produced using a rapid prototyping (RP) or rapid manufacturing (RM) manufacturing technique, which may include, for example, inkjet or 3D printing, stereo lithography, laser metal deposition or equivalents thereto. The term "rapid manufacturing" will be used herein to generally refer to all such processes, and is understood to include all of these and other rapid prototyping technologies.

As will be seen, the nano-metal coating is a nano-grain-sized metallic plating that is applied to the entirety of the core or pre-form, such as by electroplating for example. The resultant at least partially hollow vane component (the vane 23, shrouds 21, 22 and/or vane ring assembly 20) so produced is therefore a bi-material and/or bi-layer component which is lightweight yet sufficiently durable and strong, produced by a rapid manufacture of a pre-form core which is then plated by a nano-grain-size metallic coating. Although the core may be a metal, in at least one embodiment the core is composed of a polymer which may be formed by stereolithography for example.

The nano-metal coating 54 which is applied to the polymer core 50 of the vane components 23, 25, 20, etc. as described herein may comprise the nano-metal materials described in U.S. patent application Ser. No. 13/189,077 filed on Jul. 22, 2011 and Ser. No. 13/189,059 filed Jul. 22, 2011, the entire content of each of which is incorporated herein by reference. More particularly, the nanocrystalline metallic coating 54, which forms an outer shell that fully envelopes the polymer core 50 of the vane components, includes a single layer topcoat of a nano-scale, fine grained metal that may be nickel base, cobalt base or ferrous base, for example. The metal topcoat 54 thus defines the outer surface of the vane. It is to be understood that the term "base" is intended to identify the substrate material of the nanocrystalline coating 54.

In a particular embodiment, the nanocrystalline grain sized metal topcoat 54 is applied directly to the pre-formed core 50. Auxiliary processes to improve plating adhesion of the nanocrystalline metal topcoat 54 to the pre-formed core 50 may also be used, and can include: surface activation, surface texturing, applied resin and surface roughening or other shaping. Another example, described in more detail in U.S. Pat. No. 7,591,745, which is incorporated herein, involves employing a layer of conductive material between the substrate and topcoat layer to improve adhesion and the coating process. In this alternate embodiment, an intermediate bond coat is first disposed on the core 50 before the nanocrystalline metallic topcoat 54 is applied thereto, such as by electroplating for example. This intermediate bond coat may improve adhesion between the nanocrystalline metal coating 54 and the polymer substrate of the core 50 and therefore improve the coating process, the bond strength and/or the structural performance of the nanocrystalline metal coating 54 that is bonded to the core 50.

The nanocrystalline metal top coat layer 54 has a fine grain size, which provides improved structural properties of the vane component. The nanocrystalline metal coating is a fine-grained metal, having an average grain size at least in the range of between 1 nm and 5000 nm. In a particular embodiment, the nanocrystalline metal coating has an average grain size of between about 10 nm and about 500 nm. More particularly, in another embodiment the nanocrystalline metal coating has an average grain size of between 10 nm and 50 nm, and more particularly still an average grain size of between 10 nm and 15 nm. The thickness of the single layer nanocrystalline metal topcoat 54 may range from about 0.001 inch (0.0254 mm) to about 0.125 inch (3.175 mm), however in a particular embodiment the single layer nano-metal topcoat 54 has a thickness of between 0.001 inch (0.0254 mm) and 0.008 inches (0.2032 mm). In another more particular embodiment, the nanocrystalline metal topcoat 54 has a thickness of about 0.005 inches (0.127 mm). The thickness of the topcoat 54 may also be tuned (i.e. modified in specific regions thereof, as required) to provide a structurally optimum part. For example, the nanocrystalline metal topcoat 54 may be formed thicker in regions which are known to be more structural and/or more erosion demanding of the vane core 50, such as the leading edge, and thinner in other less demanding regions, such as the central region of the airfoil portion. The thickness of the metallic topcoat 54 may therefore not be uniform throughout the airfoil or throughout the vane component. This may be done to reduce critical stresses, reduce deflections and/or to tune the frequencies of the vane.

The nanocrystalline topcoat substrate metal 54 may be a metal such as one selected from the group consisting of: Ag, Al, Au, Co, Cu, Cr, Sn, Fe, Mo, Ni, Pt, Ti, W, Zn and Zr, and more preferably from the group consisting of: Al, Co, Cu, Cr, Fe, Mo, Ni, Ti, W and Zr. The manipulation of the metal grain size, when processed according to the methods described below, produces the desired mechanical properties for a vane in a gas turbine engine. In a particular embodiment, the substrate metal of the nanocrystalline metal topcoat 54 is nickel (Ni) or cobalt (Co), such as for example Nanovate™ nickel or cobalt (trademark of Integran Technologies Inc.) respectively, although other metals can alternately be used, such as for example iron (Fe) or one of the above-mentioned metals. The nanocrystalline metal topcoat 54 is intended to be a metal of nano-scale grain size.

In a particular embodiment, the nanocrystalline metal topcoat 54 is a plated coating, i.e. is applied through a plating process in a bath, to apply a fine-grained metallic coating to the article, such as to be able to accommodate complex vane geometries with a relatively low cost. Any suitable coating process can be used, such as for instance the plating processes described in U.S. Pat. No. 5,352,266 issued Oct. 4, 1994; U.S. Pat. No. 5,433,797 issued Jul. 18, 1995; U.S. Pat. No. 7,425,255 issued Sep. 16, 2008; U.S. Pat. No. 7,387,578, issued Jun. 17, 2008; U.S. Pat. No. 7,354,354 issued Apr. 8, 2008; U.S. Pat. No. 7,591,745 issued Sep. 22, 2009; U.S. Pat. No. 7,387,587 B2 issued Jun. 17, 2008; and U.S. Pat. No. 7,320,832 issued Jan. 22, 2008; the entire content of each of which is incorporated herein by reference. Any suitable number of plating layers (including one or multiple layers of different grain size, and/or a larger layer having graded average grain size and/or graded composition within the layer) may be provided. The nanocrystalline metal material(s) used for the topcoat 54 described herein may also include the materials variously described in the above-noted patents, namely in U.S. Pat. No. 5,352,266, U.S. Pat. No. 5,433,797, U.S. Pat. No. 7,425,255, U.S. Pat. No. 7,387,578, U.S. Pat. No. 7,354,354, U.S. Pat. No. 7,591,745, U.S. Pat. No. 7,387,587 and U.S. Pat. No. 7,320,832, the entire content of each of which is incorporated herein by reference.

Referring back to FIGS. 3a-3c, the vane component(s) 23, 25, 20, etc. of the present disclosure are therefore formed by creating a pre-formed core 50 produced using a rapid manufacturing process to apply the material to freeform the core having a space frame structure 26 of composite, polymer or metal, regardless of the complexity of the shape of the vane component, without requiring a complex process (such as casting, forging, machining, or combinations thereof) which is typically required for such gas turbine engine parts. While this rapidly produced pre-form core 50 is much easier to manufacture, it is by itself less strong and resistant that corresponding parts machines of solid metal for example. Accordingly, the pre-formed core 50 of the presently described vane component(s) is then plated with a nano-metal coating 54, as described above, which is applied to the entirety of the component such as to encapsulate the weaker core with a superior strength skin or coating formed of the nano-grain-size metal to provide the component with a sufficient level of durability, strength and fatigue endurance.

A feature of this method of manufacturing is that the best aerodynamic component shape can be designed for manufacture without need to modify this shape due to manufacturing limitations or dynamic limitations, given that the rapid manufacturing process used to create the core of the vane components enables complex shapes to be readily produced in freeform with specific tailored properties and performance characteristics at any specific location(s) specified. Additionally, tuning and adjustment of the vane dynamics can be performed by varying the density, structure/geometry and arm thicknesses of the space frame 26 as well as airfoil thickness in the internal open space of the core without changing the external airfoil shape. Hence, when manufacturing the present vane airfoil, there is no need to compromise aerodynamic airfoil shape to meet vane dynamic requirement.

Another feature of the method of manufacturing is that design efficiency can be greatly improved by reducing and/or eliminating the time needed to iterate back and forth to design an aerodynamically and dynamically acceptable component, such as an airfoil, as a result of using rapid prototyping or rapid manufacturing technology.

Additionally, the present method of manufacturing provides for the manufacture of complex contour aerodynamic shapes due to the use of two dimensional or three dimensional imaging techniques, such as stereo lithography, to control a rapid prototyping or manufacturing apparatus. This manufacturing method also enables a low pre-formed manufacturing cost as compared to injection molding techniques which are often not feasible to make complex contour aerodynamic shapes.

A still further feature of the method of manufacturing is that there is no tooling cost when using computer control machinery to form a three dimensional component using lithography, 3-D print, laser metal deposition or similar techniques as information sources to control a computer operated manufacturing apparatus. Another feature of the method of manufacturing by freeform fabrication is that it saves development time and eliminates soft and hard tooling costs for production.

The method described herein includes the production of such vane components by the use of rapid prototyping or rapid manufacturing technologies whereby a pre-form or core of the component is first manufactured, for example using a computer controlled machine for freeform fabrication, which is then covered, such as by electroplating for example, with a nanocrystalline metal coating. In one possible embodiment, therefore, the method involves providing a two dimensional or a three dimensional image computer-readable design information source which is representative of the component to be manufactured. The component further has an internal open space core, such as an airfoil vane having a hollow core. The computer readable design information source drives a machine capable of reproducing in polymer material or in metal the pre-form core of the vane component from the computer-readable design information source, such as to form a rapid-manufactured pre-form or core of the vane component, having a hollow cavity therewithin.

After the pre-form core of the vane component so formed, it is then plated with a nano-grain size metallic coating 54, such as to coat the rapid-manufactured vane component on all exposed surfaces, including the internal open cavity 52 within the core 50. Because the core 50 of the vane component is made using rapid prototyping or rapid manufacturing technology, the vane component is able to be produced much faster and at much lower costs as no special tooling is required. Additionally, contrary to more commonly used casting or forging, and finish machining processes whereby the end component is created by removing (i.e. machining away) material from a larger piece of stock material, the presently described rapid manufacturing process used to form the core 50 of the vane component is created by gradually adding material to form the vane core 50 having the desired shape and profile.

The nano-grain size metallic particle plating may be performed by techniques, such as electroplating. Further, the component may be plated with additional layers of nano-grain size metal particles to vary the surface density and shape of the coating depending on impact resistance, erosion resistance or dynamic requirements of the component. The additional layers may also be comprised of one or more different metallic compositions and thicknesses to optimize at least some of the characteristics of strength, stiffness, durability, galvanic potential, thermal expansion, corrosion resistance, erosion resistance and weight of the component part.

It is also of note that the use of polymer material to form the core 50 of the vane component provides a vibration damping feature and weight reducing feature of the core of the vane component, and the space frame core cavity and the nanocrystalline metal coating 54 adds to the structural integrity of the component.

The component manufactured in accordance with the present disclosure may be a hollow airfoil vane 23 as described above, or alternately may be a vane 25' of a vane-shroud pack 25 as illustrated in FIG. 4. The vane-shroud pack 25, of a vane ring assembly, may include a single vane 25' as shown in FIG. 4, or may alternately comprise multiple vanes in the same vane-shroud pack. The vane 25' of the vane-shroud pack 25 includes core cavity 30, indicated in phantom lines in FIG. 4, which is provided with shroud openings 31 and 33 to provide passage for hot air deicing. The openings 31, 33 may optionally be sealed by closure members 32 and 34. The closure members 32, 34 may be adhesively bonded or laser welded in the openings 31, 33. Sealing of the cavity may be done before or after the nanometal plating. The cavity sealing options provide a means for making the nanometal plate inside the core cavity, which is different from that of the airfoil gas path surface. The plating for the core cavity and the plating for the gas path surface may differ in plating thickness, in plate metal compositions, in the number of plating layers, in gain size, and combinations thereof, as may be required to suit functional requirements such as corrosion resistance, erosion resistance, impact resistance, etc. Alternately, the core cavity may be sealed before nanometal plate is applied, in which case only the external surfaces are nanometal plated thereby reducing the overall weight of the component.

It is also of note that the vane component described herein may be a hollow vane-shroud such as illustrated in FIG. 3b, and as therein shown the vanes 23 can be mechanically secured to the shrouds such that replacement of damaged vanes can be readily made.

Figure 5:
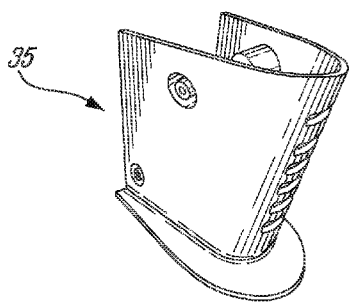
FIG. 5 is a perspective view of an aerodynamically shaped fairing.
Figure 6:
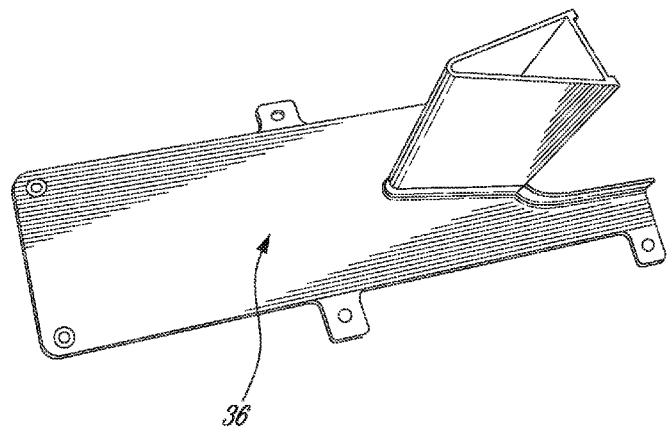
FIG. 6 is a perspective view of an aerodynamically shaped fairing having an integral gas path surface.

FIG. 5 illustrates a fairing 35 as an example of a further component that can be reproduced by the method of manufacturing described hereinabove. A fairing assembly 36 having integral gas path surface(s) thereon as shown in FIG. 6 may also be manufactured in accordance with the method of manufacturing described above.

An advantage of using this method of manufacturing using rapid prototyping or rapid manufacturing technology is that tolerances in designs can be as low as 0.001 inch or less. Also, the density and the structural geometry of the open space core frame may vary in the airfoil and at any desired locations to meet vane dynamic requirements. Complex geometrical shapes can be formed to delineate the open space core using the rapid manufacturing technology, such as for example by deposition and therefore any 2D or 3D geometric space frame configurations can be manufactured as compared to conventional molding techniques where such could not be formed.

It is further pointed out that replaceable vane-shroud assemblies can be made by incorporating a tongue and glue joint at the edges of the shrouds such that individual damaged vanes, or vane-shroud pack as shown in FIG. 3, can be replaced easily. Optionally, the assembly may also be extrude honed after metal plating for improved aerodynamics. The composition for the airfoil and shroud may be different to allow lighter but stronger more durable vane assembly. The method may also be applicable to make duct shell segments or access doors, fan blades or fan hub spacers, and other components of a turbine engine.

Figure 7:
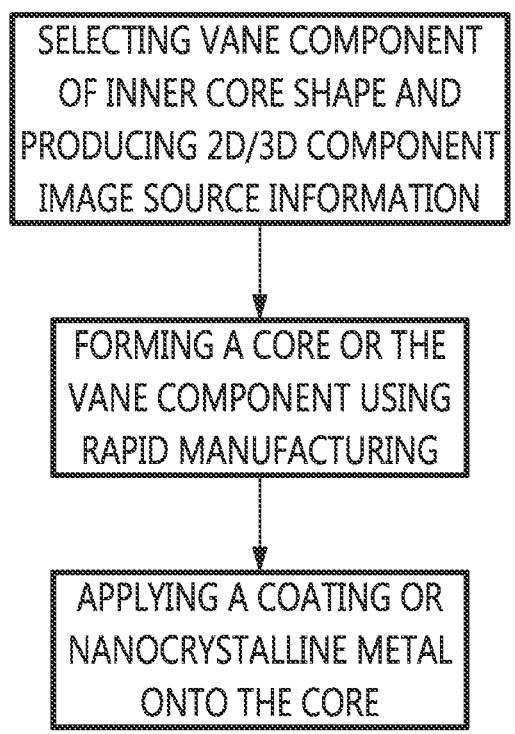
FIG. 7 is block diagram illustrating the general manufacturing steps for producing a vane component of a turbine engine as defined herein.

FIG. 7 is a block diagram illustrating the basic manufacturing steps for the manufacture of components, as above-described, and comprises generally at least the basic steps of: forming a core of the vane component out of a substrate material using a rapid manufacturing process; and then applying a coating of nanocrystalline metal onto the core to encapsulate it and define the outer structural surface of the vane component. Optionally, the core has a space frame cavity, and is freeform fabricated from the substrate material using a rapid manufacturing process and is then plated with a nanocrystalline metal as described above. Further still, in one embodiment, prior to forming the core, a computer readable information source is first produced that is representative of the selected vane component and inner core shape, and includes for example 2D or 3D images of the vane component, which computer readable information source is then used in a computer-controlled rapid manufacturing machine to perform the rapid manufacture of the core. Other steps of the present manufacturing method are possible as described herein, and the steps shown in FIG. 7 are representative only of one particular basic embodiment of the described method of manufacturing a vane component of a gas turbine engine.

Referring back to FIGS. 3a-3c, at least the airfoil portion 51 of each vane 23, but more particularly the entire vane 23, is formed of a bi-material or bi-layer structure comprising a core 50, preferably but not necessarily made of a non-metallic core substrate material, such as a composite or polymer for example, with a nanocrystalline metallic outer coating or shell 54 which covers at least a majority of the inner core 50, and which may in a particular embodiment fully encapsulate the entire core 50. Accordingly, a "hybrid" vane component is thus provided. Regardless of the material selected, the core 50 of the vane 23 is formed by a rapid manufacturing process, such as rapid prototyping, 3D inkjet or 3D printing, stereolithography, laser metal deposition, etc., and in at least the depicted embodiment the core 50 so produces includes a void 52 therewithin to form a hollow core body. The metallic top coat 54, which may be a single layer coating or a multiple layer coating composed of a nanocrystalline gain-sized metal (i.e. a nano-metal coating having a nano-scale crystalline structure—as described herein) and/or other non-nanocrystalline metal coatings. Although the nanocrystalline metal outer coating may preferably be formed from a nickel base, cobalt base or ferrous base metal, as noted further above, in an alternate embodiment the nanocrystalline metal layer may also be composed of an alloy of one or more of the metals mentioned herein.

The vane component (i.e. having a rapid-manufactured core, either with or without an underlying hollow space frame structure, unto which a nanocrystalline metal coating is plated) produced in accordance with the above-described method accordingly provides several advantages over traditional metal vane components produced using conventional casting, forging and/or machining processes. These advantages include, but are not limited to: the ability to directly and rapidly manufacture a dynamically tuned light weight hollow nano-grain-size metal vane assembly having superior specific strength and superior fatigue endurance relative to conventional metal vanes; that the best aerodynamic vane airfoil shape can be designed for manufacture by simply designing, tuning, and adjusting the density and structure/geometry of the space frame inside the vane airfoil; that there is no need to compromise aerodynamic airfoil shape to meet vane dynamic requirements, given that the presently described vane component can be dynamically tuned from the inside and using the shape, density, thickness, etc. of the core; improved design efficiency that significantly reduces time to design an aerodynamically and dynamically acceptable airfoil; superior performance due to ability and versatility of lithography, 3D printing or other rapid manufacturing process to make complex contour aerodynamic shapes; low pre-form manufacture cost, comparable to injection moulding for example; very little to no tooling costs, due to the rapid freeform manufacture (ex: stereolithography) of the core which does not require tooling; the ability to inexpensively create pre-form core shapes that would be otherwise difficult if not impossible to producing using traditional machining; and reduction in development time and the reduction or elimination of soft tooling cost for development and hard tooling cost for production.

The above description is meant to be exemplary only, and one skilled in the art will recognize that changes may be made to the embodiments described without departing from the scope of the invention disclosed. For example, although the disclosed method is described with respect to the production of a vane component of a gas turbine engine, this method can also be used to produce other gas turbine engine parts (i.e. components which are not vanes or vane related), particularly those having a highly complex geometry for example. Further, the presently described vane component may have any suitable configuration, such as individual insertable airfoils, a vane with integral inner and/or outer shrouds, a vane segment comprising a plurality of airfoils on a common inner and/or outer shroud segment, and a complete vane ring. While the term "rapid manufacturing" as used herein is understood to include any rapid prototyping, rapid manufacturing processes, such as stereolithography, etc, other types of rapidly produced manufacturing processes and technologies may also be used for the production of the core of the presently described vane component, all of which are understood to included in the term "rapid manufacturing" as used herein. Still other modifications which fall within the scope of the present invention will be apparent to those skilled in the art, in light of a review of this disclosure, and such modifications are intended to fall within the appended claims.

The invention claimed is:

1. A method of manufacturing a vane component of a gas turbine engine, the method comprising:

forming, using a rapid manufacturing process, an internal space frame structure out of a substrate material and forming, using the rapid manufacturing process, a core of the vane component with a cavity therein by applying the substrate material to the space frame structure such that the core is at least partially hollow; and applying a coating of nanocrystalline metal onto the core, the nanocrystalline metal fully encapsulating the core and defining an outer structural surface of the vane component.

2. The method of claim 1, wherein the step of forming the core further comprises forming the core out of at least one of a composite material and a polymer material using the rapid manufacturing process.

3. The method of claim 1, wherein the rapid manufacturing process includes at least one of rapid freeform fabrication technologies, stereolithography, 3D inkjet printing, 3D printing, laser metal deposition, selective laser sintering, direct metal deposition, direct laser powder deposition.

4. The method of claim 1, wherein the step of applying the coating further comprises plating the nanocrystalline metal coating onto the core.

5. The method of claim 4, further comprising electroplating the nanocrystalline metal coating onto the core.

6. The method of claim 4, wherein the step of plating the nanocrystalline metal coating includes plating a single layer of nano-scale nickel base, ferrous base or cobalt base metal onto the core.

7. A method of manufacturing a vane component of a gas turbine engine, the method comprising the steps of:
   i) using a computer-controlled rapid manufacturing machine to produce a pre-form core of said vane component out of a core substrate material, the core defining a cavity therein such that the core is at least partially hollow, the core substrate material comprising composite, polymer or metal, the computer-controlled rapid manufacturing machine being controlled by a computer readable information source representative of the core of the vane component;
   ii) applying the core substrate material to fabricate a space frame structure within the cavity using the computer-controlled rapid manufacturing machine to form the pre-form core; and
   iii) plating said pre-form core produced by the computer-controlled rapid manufacturing machine with a nano-grain size metallic coating to encapsulate the pre-form core with said nano-grain size metallic coating and define an outer structural surface of the vane component.

8. The method of claim 7, further comprising, prior to said step (i), producing the computer readable information source representative of the core of the vane component, the information source comprising a two-dimensional or a three-dimensional image of said vane component.

9. The method of claim 7, wherein said vane component is a vane assembly of said gas turbine engine, the vane assembly including at least one of a hollow vane, a hollow vane shroud, a hollow vane shroud pack and a vane ring assembly.

10. The method of claim 7, wherein said step (iii) further comprises using at least one of electroplating and laser metal deposition to apply said nano-grain size metallic coating onto said pre-form core of said vane component.

11. The method of claim 7, wherein the step (ii) further comprises varying at least one of a space frame density or cell size, space frame geometry, space frame arm thickness, core airfoil skin thickness, and shape of the pre-form core cavity depending on dynamic requirements of said vane component.

12. The method of claim 7, further comprising varying at least one of metal composition, grain size, density and thicknesses of said nano-grain size metal coating, in order to optimize at least one of the characteristics of strength, stiffness, ductibility, galvanic potential, thermal expansion, corrosion resistance, erosion resistance, impact resistance, and weight of said vane component.

13. The method of claim 7, wherein said vane component includes a hollow vane airfoil and wherein said cavity is connected through openings in shrouds of the pre-form core to provide for hot air deicing of the hollow vane airfoil.

14. The method of claim 13, further comprising the step of closing said cavity with a closure member secured within the openings in said cavity of said vane airfoil by adhesive bonding or laser welding.

15. The method as claimed in claim 7, further comprising forming the space frame structure of the pre-form core with a hexadron or tetrahedron structural geometrical shape.

* * * * *